United States Patent [19]
Flournoy et al.

[11] 3,811,505
[45] May 21, 1974

[54] SURFACTANT OIL RECOVERY PROCESS USABLE IN FORMATIONS CONTAINING WATER HAVING HIGH CONCENTRATIONS OF POLYVALENT IONS SUCH AS CALCIUM AND MAGNESIUM

[75] Inventors: Kenoth H. Flournoy; Ricardo L. Cardenas; Gilbert L. Haferkamp; Russell D. Shupe, all of Houston, Tex.

[73] Assignee: Texaco Inc., New York, N.Y.

[22] Filed: Jan. 29, 1973

[21] Appl. No.: 327,265

[52] U.S. Cl............. 166/274, 166/273, 252/8.55 D
[51] Int. Cl............................................ E21b 43/22
[58] Field of Search........................... 166/273–275, 166/268, 270; 252/8.55 D

[56]  References Cited
UNITED STATES PATENTS

| | | | |
|---|---|---|---|
| 3,096,820 | 7/1963 | Bernard | 166/274 |
| 3,348,611 | 10/1967 | Reisberg | 166/275 |
| 3,369,602 | 2/1968 | Fallgatter et al. | 166/273 |
| 3,371,710 | 3/1968 | Harvey et al. | 166/273 |
| 3,437,141 | 4/1969 | Brandner et al. | 166/273 |
| 3,455,386 | 7/1969 | Reisberg | 166/275 |
| 3,467,190 | 9/1969 | Dunlap et al. | 166/274 |
| 3,477,508 | 11/1969 | Hurd | 166/273 X |
| 3,498,379 | 3/1970 | Murphy | 166/274 |
| 3,508,612 | 4/1970 | Reisberg et al. | 166/275 X |
| 3,739,848 | 6/1973 | Lawson et al. | 166/274 |

*Primary Examiner*—Stephen J. Novosad
*Attorney, Agent, or Firm*—T. H. Whaley; C. G. Reis

[57] ABSTRACT

A dual surfactant system usable in the presence of from about 500 to about 9,000 parts per million polyvalent ions, such as calcium and/or magnesium, and a method of using said surfactant system for recovering petroleum from subterranean formations, said surfactant system comprising a water soluble salt of an alkyl or an alkylaryl sulfonate or phosphate wherein the alkyl chain has from 5 to 25 carbon atoms, plus a nonionic surfactant such as a polyethyoxylated alkyl phenol or a polyethyoxylated aliphatic alcohol.

18 Claims, 6 Drawing Figures

SURFACTANT OIL RECOVERY PROCESS USABLE IN FORMATIONS CONTAINING WATER HAVING HIGH CONCENTRATIONS OF POLYVALENT IONS SUCH AS CALCIUM AND MAGNESIUM

BACKGROUND OF THE INVENTION

1. Field of the Invention

This invention relates to a method for recovering petroleum from subterranean petroleum containing formations, and more particularly to a surfactant flooding method for recovering petroleum from petroleum containing formations. still more particularly, this invention pertains to a novel surfactant mixture which will function effectively in the presence of formation water containing high polyvalent ion concentrations, e.g., high calcium or magnesium concentrations, which cause precipitation of conventional surfactants, and to a method for using such novel surfactant composition in a surfactant flooding process for recovering petroleum.

2. Description of the Prior Art

Petroleum is normally recovered from subterranean formations in which it has accumulated by penetrating said formation with one or more wells and pumping or permitting the petroleum to flow to the surface through these wells. Recovery of petroleum from petroleum containing formations is possible only if certain conditions are satisfied. There must be an adequately high concentration of petroleum in the formation, and there must be sufficient porosity and permeability or interconnected flow channel throughout the formation to permit the flow of fluids therethrough if sufficient pressure is applied to the fluid. When the subterranean petroleum containing formation has natural energy present in the form of an underlying active water drive, or gas dissolved in the petroleum which can exert sufficient pressure to drive the petroleum to the producing well, or a high pressure gas cap above the petroleum within the petroleum reservoir, this natural energy is utilized to recover petroleum. Recovery of petroleum by utilization of natural energy is referred to as primary recovery. When this natural energy source is depleted, or in the instance of those formations which do not originally contain sufficient natural energy to permit primary recovery operations, some form of supplemental recovery process must be utilized in order to extract petroleum from the subterranean petroleum containing formation. Supplemental recovery is frequently referred to as secondary recovery, although in fact it may be primary, secondary or tertiary in sequence of employment.

Water flooding, which involves the injection of water into the subterranean, petroliferous formation for the purpose of displacing petroleum toward the producing well, is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this weakness of water flooding and many additives have been described in the prior art for decreasing the interfacial tension between the injected water and the formation petroleum. For example, U. S. Pat. No. 2,233,381 (1941) disclosed the use of polyglycol ether as a surface active agent or surfactant to increase the capillary displacement efficiency of an aqueous flooding medium. U. S. Pat. No. 3,302,713 discloses the use of petroleum sulfonate prepared from the 850° to 1,050°F. boiling range fraction of petroleum crude as a surfactant for use in oil recovery operations. U. S. Pat. No. 3,468,377 (1969) describes the use of petroleum sulfonates of a specified molecular weight for oil recovery. Other surfactants which have been proposed for oil recovery include alkylpyridinium salts, alkyl sulfates, alkyl sulfonates, and quaternary ammonium salts.

The above described surfactants are satisfactory for surfactant flooding in petroliferous formations only if the calcium and magnesium concentration of the formation water is below about 500 parts per million. Petroleum sulfonate is one of the most popular and desirable surfactants because of its high surface activity and low unit cost, although it also suffers from the limitation that it can be used only when the total formation water hardness (calcium + magnesium) is less than about 500 parts per million. If the formation water calcium and/or magnesium content exceeds about 500 parts per million, petroleum sulfonates precipitate rapidly. When precipitation of the added material occurs, not only is the desired beneficial result lost, but plugging of the formation will very likely result.

Many subterranean petroleum containing formations are known to exist which contain polyvalent ions such as magnesium and calcium in concentrations far in excess of 500 parts per million. The most common of such reservoirs are limestone formations which may have polyvalent ion cencentrations from 1,000 to as high as 20,000 parts per million in the original connate water, and the formation water after the formation has been subjected to flooding with fresh water may have concentrations of calcium and/or magnesium from about 500 to about 15,000 parts per million. Since surfactants usable for oil recovery operations precipitate when exposed to aqueous environments having a total hardness in excess of about 500 parts per million, such surfactants could not be used in limestone reservoirs. If an aqueous solution of petroleum sulfonate, for example, where injected into a limestone reservoir, the petroleum sulfonate would precipitate immediately on contacting the high calcium containing formation water. In such a process, the flood water would have essentially no surfactant present in it to decrease the interfacial tension between water and petroleum. Furthermore, precipitated petroleum sulfonate plugs the small flow channels in the subterranean petroleum containing formation, decreasing the formation porosity and injectivity, thereby causing a substantial decrease in the oil displacement efficiency.

Nonionic surfactants, such as polyethoxylated alkyl phenols, polyethoxylated aliphatic alcohols, carboxylic esters, carboxylic amides, and polyoxyethylene fatty acid amides, have a somewhat higher tolerance of polyvalent ions such as calcium or magnesium than do the more commonly utilized anionic surfactants. While it is technically feasible to employ a nonionic surfactant solution to decrease the interfacial tension between the injected aqueous displacing medium and petroleum contained in some limestone formations, such use would not be economically feasible for several reasons. Nonionic surfactants are not as effective on a per unit weight basis as are the more commonly used anionic surfactants, and furthermore, the nonionic surfactants have a higher cost per unit weight than do the anionic surfactants.

Thus it can be seen that while many surfactants have been proposed for supplemental oil recovery use, there is a substantial, unfulfilled need for a surfactant composition usable in the presence of formation waters containing calcium and/or magnesium in excess of 500 parts per million.

SUMMARY OF THE INVENTION

This invention pertains to a novel dual surfactant system and to a method for recovering petroleum from subterranean petroleum containing formations by the use of such surfactant system, said petroleum containing formation also containing water having a polyvalent ion content, for example calcium and/or magnesium, in the range of from about 500 to about 9,000 parts per million. The novel surfactant system is comprised of an aqueous solution of from about 0.05 to about 5.0 percent by weight of an anionic surfactant such as a water soluble salt of an alkyl or an alkylaryl sulfonate or phosphate, for example sodium dodecylbenzene sulfonate, plus from about 0.05 to about 5.0 percent by weight of a nonionic surfactant such as a polyethoxylated aliphatic alcohol or a polyethoxylated alkyl phenol. From about 2 percent pore volume to about 50 percent pore volume of the surfactant solution is injected into the formation. The surfactant solution may be displaced through the formation by injecting water, or it may be followed immediately by a quantity of thickened water such as is formed by mixing a small amount of a hydrophilic polymer such as polyacrylamide or polysaccharide in water to increase its viscosity, which is in turn displaced through the formation with water. Our invention therefore incorporates the novel surfactant system, and the method of using said surfactant system for the recovery of petroleum from subterranean petroleum containing formations having a polyvalent ion concentration in the formation water from about 500 to about 9,000 parts per million.

DESCRIPTION OF THE PREFERRED EMBODIMENTS

Figure 1:
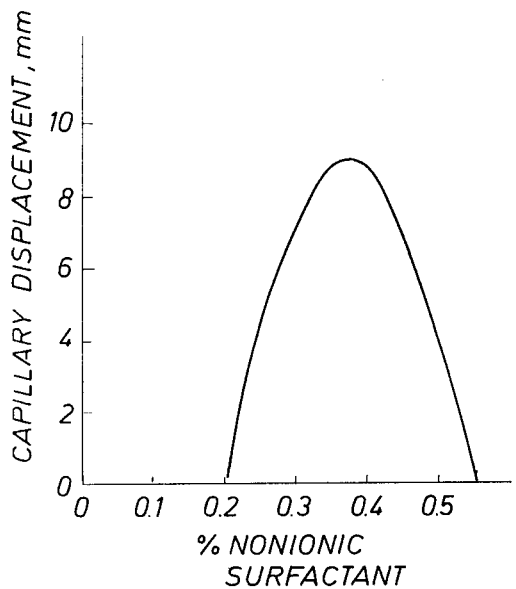
FIG. 1 illustrates the result of a series of capillary displacement tests utilizing an aqueous solution having 4,000 parts per million total hardness plus 0.4 percent of an anionic surfactant, specifically a linear alkylaryl sulfonate with varying concentrations of the nonionic surfactant, a polyethoxylated alkyl phenol from 0 to 0.5 percent.

This invention concerns a novel, multiple surfactant system which can be used in subterranean petroleum containing formations which also contain "hard water", or water having polyvalent ions such as calcium and/or magnesium dissolved therein in a concentration of from about 500 to about 9,000 parts per million. There are many petroleum containing formations which contain water having calcium and/or magnesium concentrations in the range from about 500 to about 9,000 parts per million; the most common of such formations being limestone formations. These formations frequently contain a substantial amount of petroleum after primary production and even after water flooding, but surfactant flooding cannot be employed in them because surfactants previously proposed for oil recovery are insoluble or otherwise ineffective in the presence of calcium and/or magnesium in the range of from 500 to 9,000 parts per million.

We have found that an aqueous solution of two surfactant materials, in a critical concentration range, will effectively reduce the interfacial tension between oil and water, and will function effectively in the presence of calcium and magnesium in a concentration of from about 500 to about 9,000 parts per million total hardness. The dual surfactant system comprises 1. An anionic surfactant having one of the following general formulas:

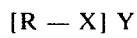

(a)

wherein R is an alkyl radical, linear or branched, having from 5 to 25 and preferably from 8 to 14 carbon atoms, X is an oxygen containing anionic radical, either a phosphate ($PO_4$) or sulfonate ($SO_3$), and Y is a monovalent cation such as sodium, potassium or ammonium, or

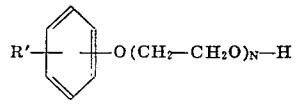

(a)

wherein R, X and Y have the same meaning as above. For example, if R is linear dodecyl, X is sulfonate and Y is ammonia, the material is ammonium dodecylbenzene sulfonate.

2. A nonionic surfactant having one of the following two general formulas:

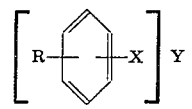

(b)

wherein R' is an alkyl radical having from 5 to 20 and preferably 8 to 14 carbon atoms, and N is a integer from 6 to 20.

$$R'' - O(CH_2-CH_2O)_{N'} H \quad \text{(b)}$$

wherein R'' is an alkyl chain having from 5 to 20 and preferably from 8 to 14 carbon atoms and N' is an integer from 6 to 20.

The term surfactant encompasses a broad spectrum of materials which share the following common characteristics:

1. The compound must be at least slightly soluble in at least one phase of a liquid system,
2. The compound must have an amphipathic structure (the molecule is composed of groups with opposing solubility tendencies). For use in oil recovery operations, the molecule must have at least one hydrophobic or oil soluble group and at least one hydrophilic or water soluble group.
3. The surfactant molecules or ions must form oriented monolayers at phase interfaces.
4. The equilibrium concentration of the surfactant in any particular solute at the phase interface is greater than the concentration of the surfactant in the bulk of the solution.
5. The material must tend to form micelles or aggregates of molecules or ions whenever the concentration exceeds a certain limiting value which is a characteristic of the particular surfactant and solute.
6. The material must exhibit some combination of the following functional properties: detergency, foaming, wetting, emulsifying, solubilizing and dispersing.

Surfactants are generally classified on the basis of the type of hydrophilic or water soluble group or groups attached to the molecule, generally being classified as anionic, cationic or nonionic, as described below more fully.

1. Anionic surfactants are those surfactant materials wherein the hydrophilic or water soluble group is a carboxylate, sulfonate, sulfate or phosphate group. This is the most important class of surfactants. Anionic surfactants are readily available, inexpensive, and have a high degree of surface activity. Petroleum recovery operations will generally involve the use of anionic surfactants unless there is some objection to the use of anionic surfactants, or some sufficient reason to resort to the use of some other compound. Petroleum sulfonates are currently very popular anionic surfactants for oil recovery, and are prepared by isolating a preselected boiling range fraction of a crude oil and subjecting it to sulfonation. Although this material is desirable for use because of its low unit cost, there are problems associated with the use of petroleum sulfonates because of the complex nature of the hydrophobic or oil soluble portion of the molecule, as well as the limited tolerance of calcium and magnesium.

2. Cationic surfactants employ primary, secondary, or tertiary amines, or quaternary ammonium groups, as the hydrophilic or water soluble group.

3. Nonionic surfactants are materials which have no charge when the material is dissolved in an aqueous medium. The hydrophilic tendency is derived from oxygen atoms in the molecule which hydrate by hydrogen bonding to water molecules present in the solute. The strongest hydrophilic moiety in this class or surfactants is the ether linkage, and there must be a plurality of these linkages present to render the compounds sufficiently water soluble to permit the compound to exhibit surface activity. Polyoxyethylene surfactants having the following recurring ether linkages are examples of hydrophilic moieties for nonionic surfactants:

$$-CH_2-CH_2-O-CH_2-CH_2-O-$$

A nonionic surfactant molecule may have more than one chain containing ether linkages and generally as much as 60 to 70 percent by weight of the molecule must be in the form of ether linkage containing chains in order to render the molecule sufficiently water soluble for it to function as a surfactant. It can be readily seen that the presence of these large chains containing the ether linkages in addition to the relatively long aliphatic or other hydrophobic chains results in a high molecular weight compound, and this is the reason that nonionic surfactants have a low surface activity per unit weight of material.

Nonionic surfactants are more efficient in the presence of high concentrations of calcium and magnesium than are either anionic or cationic surfactants, and it is possible to conduct a surfactant flood operation in a subterranean limestone formation or other subterranean petroleum containing formation wherein the formation water contains substantial quantities of calcium and/or magnesium, above 500 parts per million, although they cannot tolerate calcium and/or magnesium levels of the upper part of the hardness range encountered in limestone formations. Nonionic surfactants are also not particularly desirable for use as the sole surfactant because of their high cost per unit weight and low surface activity.

The optimum concentration of each material which constitutes the novel surfactant system of our invention will vary to a degree depending on the hardness and other characteristics of the aqueous environment in which it is to be used. Ideally, this should be determined by test utilizing the actual formation water in which the material will be used. Generally from about 0.05 percent to about 5.0 percent and preferably from about 0.2 to about 0.5 percent by weight of the nonionic surfactant and from about 0.05 to about 5.0 percent and preferably from about 0.20 to 0.50 percent by weight of the anionic surfactant will be effective within the 500 to 9,000 parts per million hardness range of the aqueous environment. The ratio of anionic to nonionic surfactant may range from 0.10 to 10. The ratio of anionic surfactant to nonionic surfactant for optimum surface tension reduction is roughly inversely related to the total hardness. Although the best performance will result from experimentation using field water, the values in Table I below are a general guideline for the ratio of anionic to nonionic surfactant.

TABLE I

| Total Harness (P.P.M.) | Ratio, Weight Percent Anionic to Weight Percent Nonionic Surfactant |
|---|---|
| 500 | 8 |
| 2000 | 4 |
| 2000 & Above | 2-1 |

In the practice of our invention, from about 2 to about 50 pore volume percent of an aqueous solution containing from about 0.05 to about 5.0 percent and preferably from about 0.2 to about 0.5 percent of a nonionic surfactant such as polyethoxylated alkyl phenol or polyethoxilated aliphatic alcohol and from about 0.05 to about 5.0 and preferably from about 0.2 to about 0.5 percent by weight of the anionic surfactant, specifically an alkyl or alkylaryl sulfonate or phosphate is injected into the subterranean petroleum containing formation. The subterranean petroleum containing formation to which this invention will be applied will ordinarily be a limestone formation, although any formation having water containing from about 500 to about 9,000 parts per million calcium and/or magnesium can effectively be exploited by means of the subject process. Ordinarily, water injection will have been applied to the reservoir first, although this is not a requirement for the employment of this invention. Water injection or water flooding is, however, a desirable first phase of the recovery program for several reasons. It is less expensive to conduct than the surfactant flooding program, and furthermore, the injection of relatively fresh water into a formation containing connate water having high concentrations of calcium and/or magnesium will result in the lowering of the connate water hardness to a point where a chosen surfactant composition will operate more effectively. As will be seen later hereinafter in this specification, it is not necessarily to be expected that the optimum interfacial tension reduction will be achieved at the lowest possible total hardness. This furnishes still another reason for the desirability that actual experimentation be undertaken utilizing the available formation water or a relatively close facsimile thereof, to determine the optimum surfactant composition and also the optimum hardness at which the chosen composition will function. In formations wherein it is known or expected that surfactants will be adsorbed from solution onto the formation rock, it is necessary either to use a preflush of sacrificial inorganic material such as sodium carbonate or sodium polyphosphate or to use more than the optimum concentration of surfactant as determined by capillary tests or other means. It is generally satisfactory to use up to 5 percent by weight surfactant, and this surplus material need only be added to the first ten percent or so of the surfactant slug injected. Both surfactants may tend to absorb onto the formation, or there may be a preferential adsorption of either the anionic or non-ionic surfactant used, depending on the characteristics of the formation rock.

If the viscosity of the petroleum contained in the subterranean formation is sufficiently high, the ratio of viscosities of injected fluid to displaced fluid, or mobility ratio as it is referred to in the art of supplemental oil recovery, will result in an adverse sweep efficiency, and so it will be preferably to utilize some type of additive to increase the viscosity of the injected aqueous fluid to more nearly match the viscosity of the subterranean petroleum. Hydrophilic polymers such as polyacrylamides or polysaccharides are effective for this purpose in a concentration from about 200 to about 500 parts per million in an aqueous solution. The use of this amount of polymer results in a fluid having an apparent viscosity of from about 5 to about 15 centipoise, which will generally improve the mobility ratio to a point that improved sweep efficiency can be achieved. It may be desirable to add a small concentration of the hydrophilic polymer to the surfactant solution, but it is generally satisfactory to follow the surfactant solution with a mobility buffer which comprises an aqueous solution of the hydrophilic polymer. This mobility buffer itself is then displaced through the formation by injecting water into the formation. Whether or not the mobility buffer solution is used, the final phase of the supplemental oil recovery operation will comprise the injection of water into the formation to displace the surfactant solution and the displaced oil through the formation to the producing well. Water injection will be continued until the water/oil ratio at the producing well rises to about 30 to 40.

The invention can be more fully understood by reference to the following field example, which is offered only for purpose of illustration and is not intended to be limitative or restrictive of the invention, which will be defined more precisely hereinafter in the claims.

FIELD EXAMPLE

A subterranean, petroleum containing limestone formation is found at a depth of 8,500 feet. The limestone formation is 40 feet thick and the porosity is 30 percent. The field is exploited first by primary production, utilizing a square grid pattern with 400 foot line spacing between wells. At the conclusion of primary recovery, which recovers only 25 percent of the original petroleum in place within the reservoir, injection wells are drilled in the center of each square grid to convert the field to an inverted five spot pattern for water injection. Although a large field entails a multiplicity of the square grid patterns, each 400 feet on a side and with an injection well in the center, it is possible to analyze the entire field by considering only a single grid unit. Water is injected into the injection well and production of oil is continued from the production wells until the water/oil ratio reaches 30, which is considered to be the economic limit for continued production. At the conclusion of the water flooding operation, only 45 percent of the original oil in place in the reservoir has been recovered, and same form of tertiary recovery operation must be resorted to in order to obtain any significant portion of the remaining petroleum. The formation water is analyzed and found to contain 4,000 parts per million calcium and 2,000 parts per million magnesium. Capillary displacement tests are performed using actual formation water and it is determined that the maximum capillary displacement results from the use of 0.45 percent by weight anionic surfactant, an ammonium laurylbenzene sulfonate, and 0.45 percent by weight nonionic surfactant, a 9.5 mole ethylene oxide adduct of nonylphenol. Since the formation is known to adsorb both surfactants, the first 10 percent of the surfactant slug will contain 4 percent by weight of each surfactant, and the remainder of the slug will contain 0.45 percent of each material.

Since the pattern used results in 70 percent sweep efficiency, the total pore volume swept by injected fluid is 400 Ft. × 400 Ft. × 40 Ft. × 0.30 × 0.70 = 1,344,000 Cu. Ft.

A 10 percent pore volume surfactant slug or 134,400 cu. ft. or 1,047,000 gallons is used. The first 10 percent of this slug, or 104,700 gallons contains 4 percent by weight of each material. The balance contains 0.45 percent of the anionic surfactant and 0.45 percent of the nonionic surfactant. The surfactant solution is followed by injecting 1,000,000 gallons of an aqueous solution containing 200 parts per million of polyacrylamide, a hydrophilic polymer, to increase the viscosity of the injected aqueous fluid to about 8 centipoise. Finally, water is injected into the formation to displace the surfactant, thickened water solution, and the displaced oil through the formation toward the production wells. Water injection is continued until the water/oil ratio rises to about 30, at which point the residual oil saturation is reduced to 15 percent and approximately 73 percent of the original oil in place is recovered.

EXPERIMENTAL

In order to establish the operability of this invention, and further to determine the optimum ratio of the essential constituents of the novel surfactant composition of our invention, the following experimental work was performed.

Simulated formation water was prepared to match as closely as possible the analysis of formation water obtained from the Slaughter Field, Hockley County, Tex., which was under laboratory evaluation for possible application of the subject invention. The composition of the simulated formation water is given in Table II below.

TABLE II

SIMULATED LIMESTONE FORMATION
CONNATE WATER COMPOSITION

| | |
|---|---|
| $CaSO_4$ | 0.97 Grams Per Liter |
| $CaCl_2$ | 40.65 Grams Per Liter |
| $MgCl_2 \cdot 6H_2O$ | 34.60 Grams Per Liter |
| $NaHCO_3$ | 0.40 Grams Per Liter |
| $NaCl$ | 161.90 Grams Per Liter |

Some precipitation of salts occurred, however, the water was saturated with divalent cations of the various salts used in formulating the formation water, and contained approximately 15,000 parts per million calcium and 4,500 parts per million magnesium ions. This synthetic connate water was used in varying dilutions in all of the capillary displacement tests described below.

Capillary displacement tests provide a convenient and accurate method for determining the optimum concentration of surfactants and the optimum hardness and salinity ranges for the chemical system employed. The tests are performed by filling a number of closed and capillary tubes with the particular crude oil being studied, and submerging the capillary tubes horizontally into the desired aqueous phase. In the instance of the subject series of tests, the aqueous phase comprised the indicated mixture of synthetic connate water in fresh water plus the surfactant mixture being evaluated. In each instance of displacement of oil by the aqueous phase, a meniscus is formed at the oil-water interface. The only force tending to displace oil from the capillary tube was the force resulting from the difference in specific gravities of the two fluids. This force was offset by the interfacial tension between the oil and formation water, and it was observed that essentially no displacement occurred in the instance of connate water-fresh water blends having no surfactant added thereto. When the surfactant composition was successful in producing a movement in the meniscus, the distance traveled by the meniscus in millimeters in a 5 minute exposure interval in the chemical system is recorded, and it is this displacement in millimeters that is plotted in FIGS. 1–5, which will be described more fully below. There was essentially no displacement of the meniscus in the instance of capillary tubes submerged in the formation water containing no surfactant or any kind, indicating that the interfacial tension between the crude oil and the formation water was too great to permit displacement of the oil from the capillary. The optimum reduction in interfacial tension is indicated by the maximum value of the displacement observed in the capillary tubes.

In FIG. 1 there is illustrated the capillary displacements observed in an aqueous environment having 80 percent fresh water mixed with 20 percent of the simulated connate water, (whose composition is given in Table II), corresponding to approximately 3,000 parts per million calcium and 900 parts per million magnesium. The aqueous solution also contains 0.4 percent of the ammonium salt of a lauryl benzene sulfonate, an anionic surfactant. Various solutions were prepared, also containing from 0 to 0.5 percent by weight of a nonionic surfactant, specifically Surfonic N95, a 9.5 mole ethylene oxide adduct of nonyl phenol, sold by Jefferson Chemical Company. As can be seen from the results depicted in FIG. 1, the capillary displacement remained essentially 0 when no nonionic surfactant was added to the solution, and remained at 0 until at least 0.2 percent of the nonionic surfactant was present in the aqueous environment. The capillary displacement then rose sharply to a peak value corresponding to between 0.3 to 0.4 percent by weight nonionic surfactant, and then began to decrease. Thus it can be seen that the concentration of nonionic surfactant necessary to permit the designated anionic surfactant to be used in this particular formation water and crude oil system lies within a critical range of from about 0.25 to about 0.45 percent by weight of the particular nonionic surfactant used.

Figure 2:
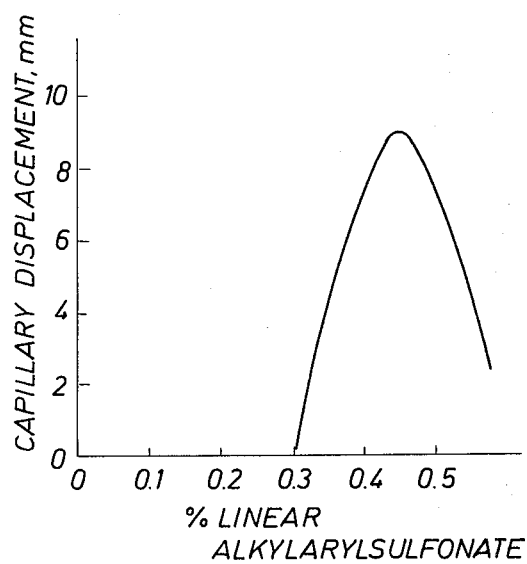
FIG. 2 illustrates the results of a series of capillary displacement tests utilizing an aqueous solution having 4,000 parts per million total hardness, 0.4 percent of the nonionic surfactant, as the anionic surfactant, an alkylaryl sulfonate concentration is varied from 0 to 0.5 percent.

FIG. 2 illustrates the displacements observed in a similar series of capillary displacement tests wherein the aqueous environment in all instances contained 20 percent of the simulated connate water whose composition is given in Table II, and 80 percent fresh water, and 0.4 percent of the nonionic surfactant Surfonic N95, and from 0 to .5% of the anionic surfactant, the ammonium salt of a lauryl benzene sulfonate. As can be seen from the data in FIG. 2, Surfonic N95 is ineffective for reducing the interfacial tension in this particular chemical system when used alone, and effective interfacial tension reduction occurs only when the concentration of the anionic surfactant exceeds 0.3 percent. The optimum concentration of the anionic surfactant in this particular chemical environment is 0.4 percent by weight, and the capillary displacement drops slightly when the concentration of anionic surfactant exceeds this value.

Figure 3:
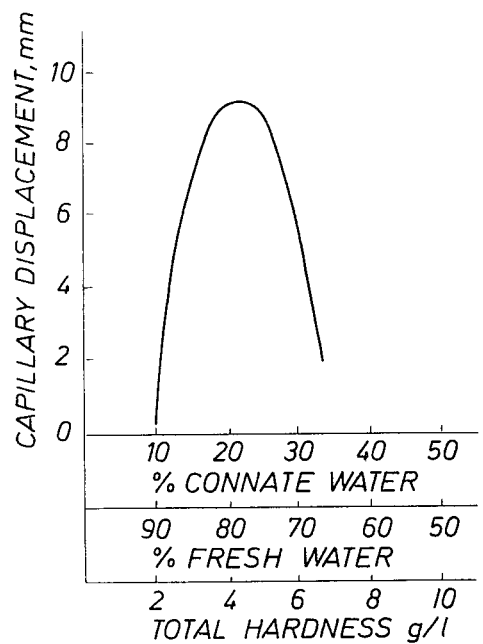
FIG. 3 illustrates the results of a series of capillary displacement tests utilizing 0.4 percent by weight of the nonionic surfactant and 0.4 percent by weight of the anionic surfactant with the total hardness varied from 0 to 10,000 parts per million.

In FIG. 3 there is illustrated the results of a series of capillary displacement tests wherein the aqueous environment in all instances contain 0.4 percent of the nonionic surfactant described above and 0.4 percent of the anionic surfactant described above, and various mixtures of fresh water and the simulated connate water whose composition is given in Table II. Thus it can be seen that the optimum concentrations of the two constituents determined in FIGS. 1 and 2 are most effective in the aqueous environment prepared by mixing 20 percent simulated connate water with 80 percent fresh water, resulting in an aqueous environment having 3,900 parts per million total hardness.

Figure 4:
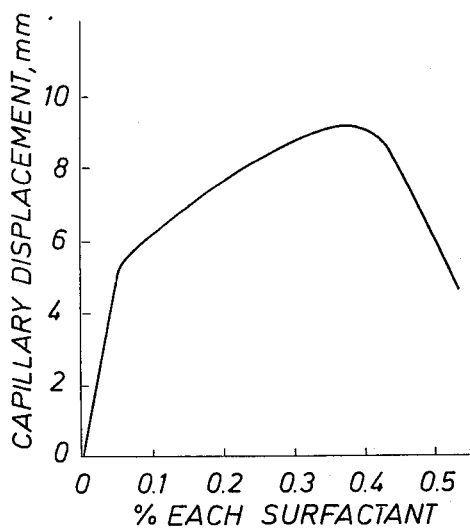
FIG. 4 illustrates the results of a series of capillary displacement tests performed using 4,000 parts per million aqueous environment with the percent of both the anionic and nonionic surfactant varied from 0 to 0.5 percent.

In FIG. 4 there are illustrated the results of a series of capillary displacement tests wherein the aqueous environment in all instances contained 20 percent synthetic connate water and 80 percent fresh water, resulting in a total hardness of 3,900 parts per million, and the concentration of the two surfactants were varied from 0 to 0.5 percent by weight. At each point the concentration of the anionic surfactant and the nonionic surfactant are the same, and it can be seen that the maximum reduction in interfacial tension occurred in this particular aqueous environment was 0.4 percent by weight anionic surfactant and 0.4 percent by weight nonionic surfactant.

Figure 5:
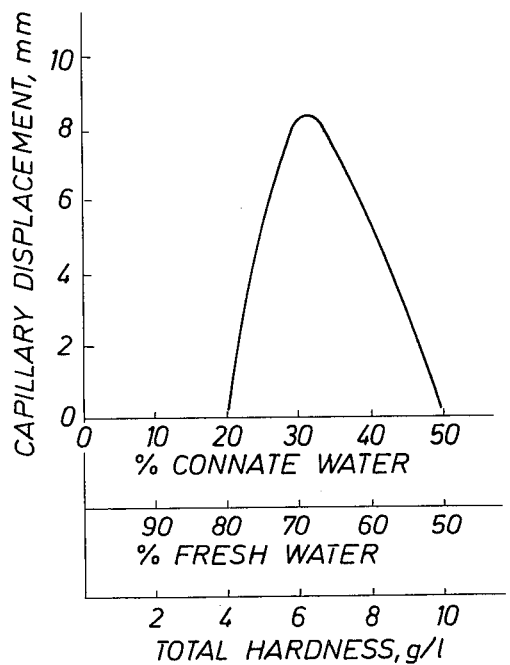
FIG. 5 illustrates the results of a series of capillary displacement tests utilizing 0.4 percent nonionic and 0.2 percent anionic surfactants as the total hardness varies from 0 to 10,000 parts per million.

In FIG. 5 there are illustrated the results of a series of capillary displacement tests similar to those reported in FIG. 3, except that in all instances the environment contains 0.4 percent nonionic surfactant and 0.2 percent anionic surfactant. It can be seen that the response is somewhat different, and the optimum capillary displacement corresponds to an aqueous environment composed of 30 percent cannate water and 70 percent fresh water, which corresponds to 6,000 parts per million total hardness. Thus it can be seen that there is some control over the suitability of the surfactant blend to the particular formation water hardness to be encountered. For this reason it is highly desirable to determine the hardness of the formation water in which the surfactant mixture is to be exposed, and to tailor the composition to some extent to this particular water hardness.

The two series of capillary displacements illustrated graphically in FIGS. 1 and 2 demonstrate that a dual surfactant chemical system has been disclosed which exhibits a synergistic interaction to function in the high calcium and magnesium aqueous environments in the manner which neither of the constituents will do when used alone. FIG. 1 demonstrates that the polyethoxylated nonylphenol nonionic surfactant is ineffective in this chemical environment unless at least 0.25 percent by weight of the ammonium salt of the laurylbenzene sulfonate anionic surfactant is added to the system. Similarly, FIG. 2 demonstrates that the nonionic surfactant is ineffective unless at least 0.35 percent of the anionic surfactant is added to the composition. Only when the two constituents are present simultaneously in the same chemical system, and in the critical concentrations for this particular crude oil, can the desired reduction of interfacial tension be achieved.

Corresponding capillary displacement tests similar to those described above and in the same aqueous environment using available petroleum sulfonate for the surfactant could not be performed because of the immediate precipitation of petroleum sulfonate on contacting the aqueous solutions containing the high concentrations of calcium and magnesium that are involved in these tests.

Figure 6:
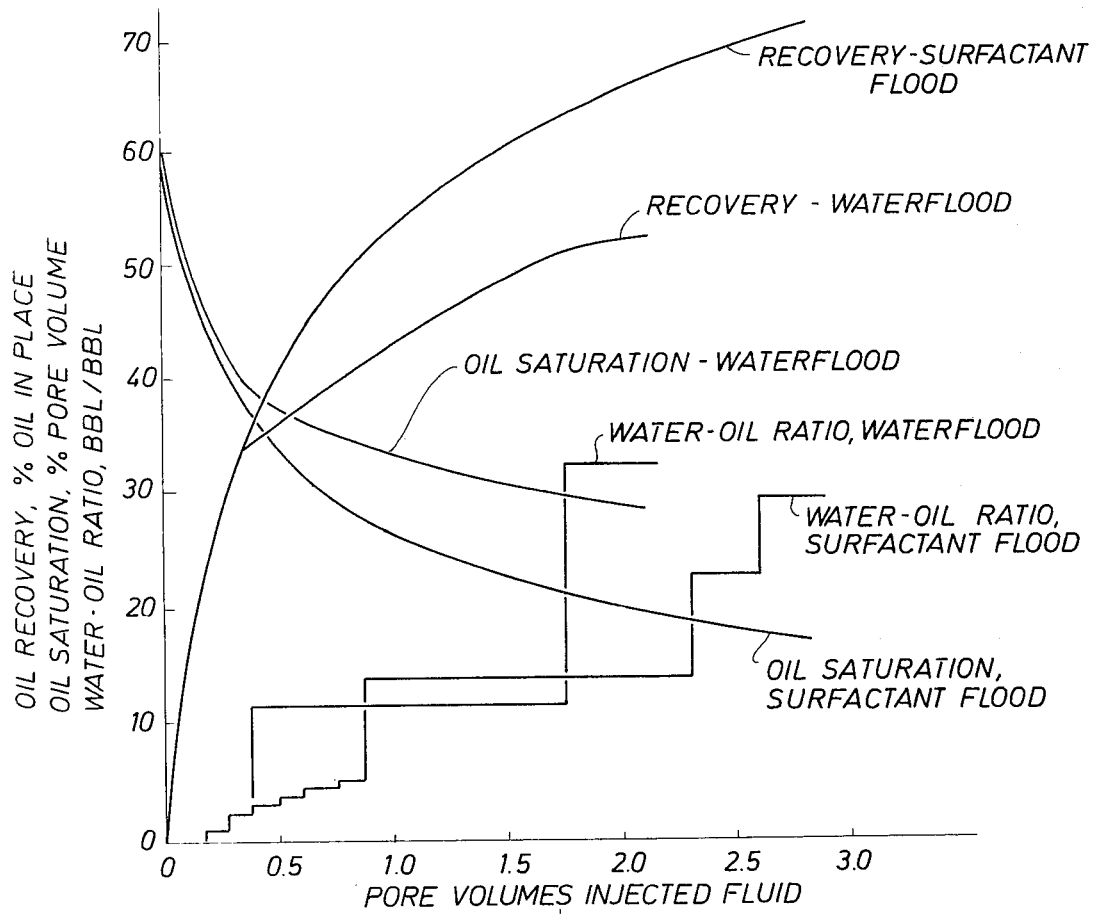
FIG. 6 illustrates the results of a laboratory core displacement test illustrating the percent oil recovery, oil saturation, and water oil ratio for a conventional water flood and for the novel surfactant flood of this invention.

In order to study the displacement performance of the optimum composition of the mixture of the ammonium salt of lauryl benzene sulfonate anionic surfactant and the polyethoxylated nonyl phenol nonionic surfactant used for this particular series of tests, laboratory displacement tests are conducted on a radial core obtained from the 5022–5024 depth of the San Andres formation in the Bob Slaughter Field, Hockley County, Tex., which is essentially a Dolomitic formation. The core was approximately 4 inches in outside diameter and had an inside bore diameter of 0.5 inches, and was approximately 4 inches long. The porosity was in the range of 20 percent and the permeability was around 12 millidarcies. A similar test was conducted to determine the response to a conventional water flood conducted to breakthrough of the injected water in order to obtain a comparison of the results obtained using treated and untreated water. In each test the clean, evacuated radial core was filled with simulated connate water which was then displaced by stock tank oil obtained from the Slaughter Field to establish initial oil saturation. Both floods were performed at a constant rate of 20 milliliters per hour, and the results obtained are given in FIG. 6. It can be seen that the optimum recovery using a conventional water flood was in the range of 50 percent, whereas approximately 72 percent recovery was possible utilizing the surfactant composition of our invention. In each instance the end point of the test was determined by the water/oil ratio, which is also graphically related in FIG. 6. It can also be seen that the residual oil saturation in the formation, which is expressed as a percent of total pore volume, is reduced to a substantial lower figure utilizing the novel surfactant flood than is possible in the instance of conventional water flood. The use of this surfactant composition resulted in the recovery of approximately 40 percent more oil than was possible by employing conventional water flooding techniques.

Thus, we have disclosed and demonstrated in laboratory experiments that the use of an aqueous solution containing from 0.05 to 5.0 percent of a polyethoxylated alkyl phenol type of nonionic surfactant plus from 0.05 to 5.0 percent by weight of a water soluble salt of a linear alkylaryl sulfonate, will effectively function as a surfactant in aqueous solution to reduce the interfacial tension between crude oil and water in the presence of hard water, e.g., water having from about 500 to about 9,000 parts per million total hardness (calcium plus magnesium). While test results of only one particular alkylaryl sulfonate anionic surfactant and one particular polyethoxylated alkyl phenol nonionic surfactant have been disclosed, many other such materials will be apparent to those skilled in the art of surfactant flooding oil recovery, and it is intended that the true spirit and scope of this invention be determined only by the claims which are appended hereinafter below.

We claim:

1. In a method for recovering petroleum from a subterranean, petroliferous, porous formation, penetrated by at least one injection well and at least one production well, said formation containing water having polyvalent ions dissolved therein in a concentration of from about 500 to about 9,000 parts per million, said recovery method being of the type wherein an aqueous fluid is injected into the formation via the injection well, and oil displaced by the injected fluid is recovered from the formation via the production well, wherein the improvement comprises injecting into the formation an aqueous surfactant solution comprising:

a. an anionic surfactant selected from the group consisting of water soluble salts of alkyl sulfonates having from 5 to 25 carbon atoms, water soluble salts of alkyl phosphates having from 5 to 25 carbon atoms, water soluble salts of alkylaryl sulfonates wherein the alkyl chains have from 5 to 25 carbon atoms, and water soluble salts of alkylaryl phosphates wherein the alkyl chains have from 5 to 25 carbon atoms, and b. a nonionic surfactant selected from the group consisting of polyethoxylated alkyl phenols wherein the alkyl constituent has from 5 to 20 carbon atoms and having from 6 to 20 polyethoxy groups, and polyethoxylated aliphatic alcohols having from 6 to 20 carbon atoms and from 6 to 20 polyethoxy groups.

2. A method as recited in claim 1 wherein a cation is associated with the anionic surfactant, said cation being selected from the group consisting of sodium, potassium and ammonium ions.

3. A method as recited in claim 2 wherein the cation is ammonium ion.

4. A method as recited in claim 1 wherein the alkyl chain of the anionic surfactant contains from 8 to 14 carbon atoms.

5. A method as recited in claim 1 wherein the alkyl chain of the nonionic surfactant contains from 8 to 14 carbon atoms.

6. A method as recited in claim 1 wherein the anionic surfactant is the ammonium salt of dodecylbenzene sulfonate.

7. A method as recited in claim 1 wherein the anionic surfactant is the ammonium salt of laurylbenzene sulfonate.

8. A method as recited in claim 1 wherein the nonionic surfactant is a polyethoxylated nonylphenol having from 9 to 10 moles of ethylene oxide.

9. A method as recited in claim 1 wherein the concentration of the anionic surfactant in the surfactant solution is from about 0.05 to about 5.0 percent by weight.

10. A method as recited in claim 1 wherein the concentration of the anionic surfactant is from about 0.20 to about 0.50 percent by weight.

11. A method as recited in claim 1 wherein the concentration of nonionic surfactant in the aqueous surfactant solution is from about 0.05 to about 5.0 percent by weight.

12. A method as recited in claim 1 wherein the concentration of nonionic surfactant is from about 0.20 to about 0.50 per by weight.

13. A method as recited in claim 1 wherein the ratio of anionic surfactant concentration to nonionic surfactant concentration is from about 1/10 to about 10.

14. A method as recited in claim 1 wherein the aqueous surfactant solution also has dissolved therein a hydrophilic polymer selected from the group consisting of polyacrylamide and polysaccharide in sufficient concentration to increase the viscosity of the aqueous surfactant solution.

15. A method as recited in claim 1 wherein the aqueous surfactant solution is followed by the injection of an aqueous solution having dissolved therein sufficient hydrophilic polymer selected from the group consisting of polyacrylamide and polysaccharide to increase the viscosity of the injected aqueous solution to a value greater than the viscosity of the formation water.

16. A method as recited in claim 1 wherein the concentration of at least one of the surfactants is greater in the first portion of surfactant solution injected into the formation than in the latter portion.

17. A method as recited in claim 1 further comprising injecting an aqueous solution of sacrificial inorganic material into the formation in advance of the surfactant solution.

18. A method as recited in claim 17 wherein the sacrificial inorganic material is selected from the group consisting of sodium polyphosphate and sodium carbonate.

* * * * *